(12) United States Patent
Lin

(10) Patent No.: US 9,113,121 B2
(45) Date of Patent: Aug. 18, 2015

(54) METHOD FOR WHITE BALANCE ADJUSTMENT OF IMAGES

(71) Applicant: HON HAI PRECISION INDUSTRY CO., LTD., New Taipei (TW)

(72) Inventor: Kuo-Hung Lin, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 128 days.

(21) Appl. No.: 13/916,587

(22) Filed: Jun. 13, 2013

(65) Prior Publication Data

US 2014/0118574 A1    May 1, 2014

(30) Foreign Application Priority Data

Oct. 29, 2012    (TW) .............................. 101139872 A

(51) Int. Cl.
*H04N 9/73*        (2006.01)
*H04N 5/228*       (2006.01)

(52) U.S. Cl.
CPC ..................................... *H04N 9/735* (2013.01)

(58) Field of Classification Search
None
See application file for complete search history.

(56) References Cited

U.S. PATENT DOCUMENTS

| 2011/0103685 A1* | 5/2011 | Bhatt ............................. 382/167 |
| 2012/0200732 A1* | 8/2012 | Takeuchi ................... 348/223.1 |
| 2014/0104454 A1* | 4/2014 | Lin et al. ..................... 348/223.1 |
| 2014/0111665 A1* | 4/2014 | Lin et al. ..................... 348/223.1 |
| 2014/0118573 A1* | 5/2014 | Lin ............................. 348/223.1 |

* cited by examiner

*Primary Examiner* — Lin Ye
*Assistant Examiner* — John H Morehead, III
(74) *Attorney, Agent, or Firm* — Novak Druce Connolly Bove + Quigg LLP

(57) ABSTRACT

A white balance adjustment method includes capturing a raw image by an image capturing device where an arrangement format of the raw image is BGb/GrR, color scale values of each color channel are extracted, the color scale values of all pixels in B, Gb, Gr, and R channels are separately scanned, and predetermined number ranges are used to classify the color scale values, then obtaining a cumulative proportion of color scale values in each channel is obtained. The cumulative proportions of each channel are compared with default minimum and maximum values, to obtain a more-than-maximum as a reference white, and a less-than-minimum as a reference black. The color scale values are re-quantized, according to the reference white and black, and a color histogram stretching method is applied to complete the white balance adjustment.

4 Claims, 4 Drawing Sheets

| B | Gb | B | Gb | B | Gb |
|---|---|---|---|---|---|
| Gr | R | Gr | R | Gr | R |
| B | Gb | B | Gb | B | Gb |
| Gr | R | Gr | R | Gr | R |
| B | Gb | B | Gb | B | Gb |
| Gr | R | Gr | R | Gr | R |

FIG. 3 ns of the pixel.
METHOD FOR WHITE BALANCE ADJUSTMENT OF IMAGES

BACKGROUND

1. Technical Field

The present disclosure relates to an image processing technology, and in particular, to a white balance process for digital color images.

2. Description of Related Art

Generally speaking, colors that reflect off an object depend on color of the light sources. A human brain is able to detect and make corrections for this type of color change. On a sunny day, a cloudy day, or in a room with light bulbs or fluorescent lamps, a human eye can adapt to the changes in color under different light sources and it will not affect the way in which humans perceive white objects. However, "white color" generated by different light sources is perceived differently by a digital image capturing device. For example, the actual colors in a photo tends to be yellowish if it is taken in a room illuminated with tungsten lamps (light bulbs), and it tends to be lightly bluish or reddish if it is taken in other environments. In order to make the colors in the photos consistent with the colors perceived by human eye, the digital image capturing device has to mimic the human brain and to adjust the colors according to the light source. It has to define the white color so that, as far as possible, it is the same in the photo as it is in the white color perceived by the human eyes. This type of adjustment is known as "white balance."

In prior art, a color histogram stretching (CHS) method is used to adjust the white balance for the image, raw histograms of red (R), green (G), and blue (B) are created as three color channels which are re-quantized into a range of 0-255, and the adjusted result shows that this method has characteristics of immediacy with only small error. However, the color histogram stretching method needs a larger memory space, to estimate a reference black color and a reference white color in the light sources. Therefore, it is necessary to provide a white balance adjustment method which maintains a high image contrast.

BRIEF DESCRIPTION OF THE DRAWINGS

FIG. 3 is a schematic view of sub-pixels arrangement of a raw image.

DETAILED DESCRIPTION

Figure 1:
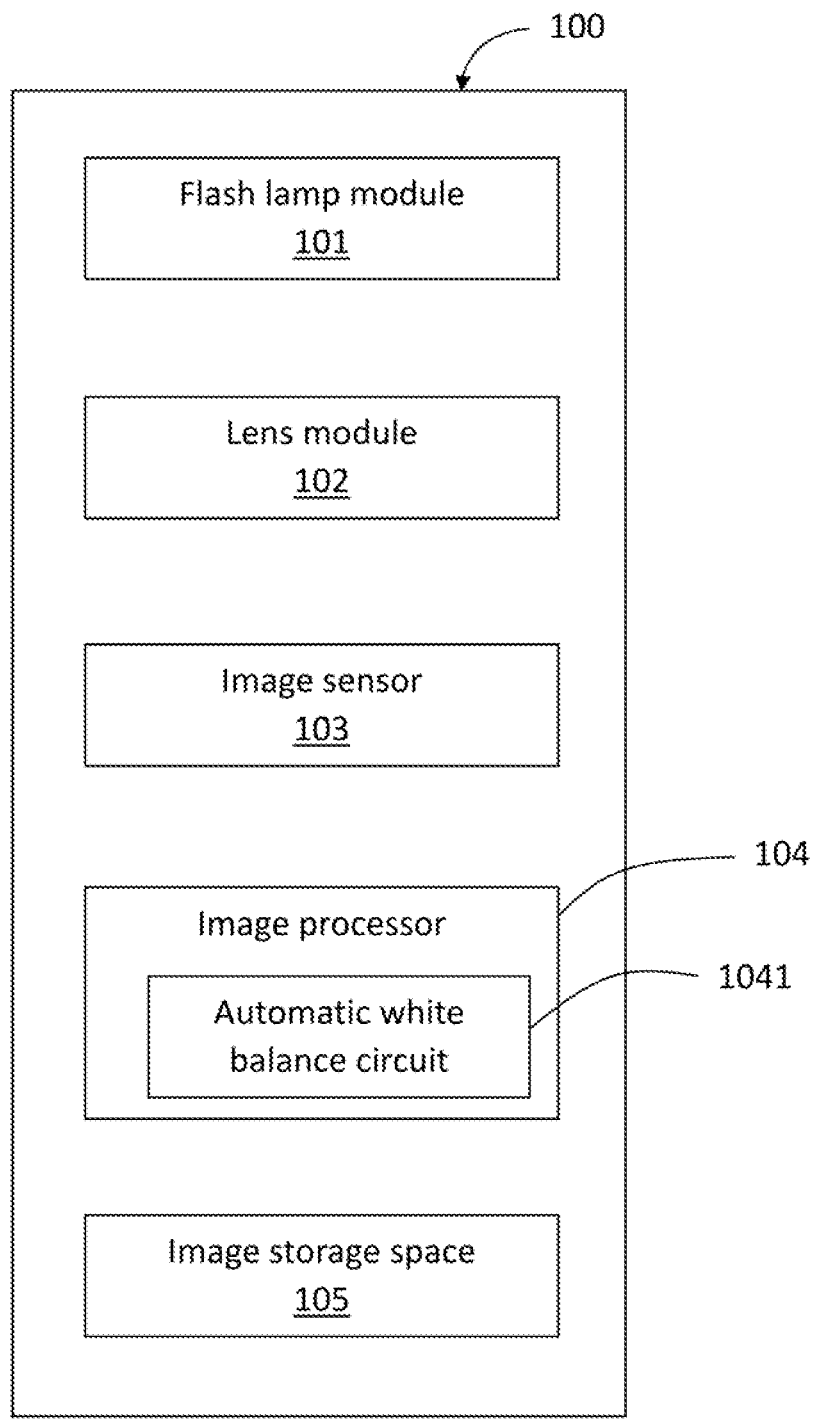
FIG. 1 is an image capturing device using the white balance adjustment method of the present embodiment.

In FIG. 1, an image capturing device 100 using the white balance adjustment method of the present embodiment includes a lens module 102, an image sensor 103, a image processor 104, and an image storage space 105. The image sensor 103 is electrically connected to the image processor 104. The lens module 102 and the image sensor 103 cooperatively capture an image, the image processor 104 receives the image from the image sensor 103, and the image storage space 105 stores a processed image. The image storage space 105 may be physical storage space, such as flash memory or random access memory, or a cache. The image storage space 105 may be non-transitory memory.

The image processor 104 includes an automatic white balance circuit 1041 to perform the white balance adjustment method of the present embodiment. The image capturing device 100 further includes a flash lamp module 101.

Figure 2:
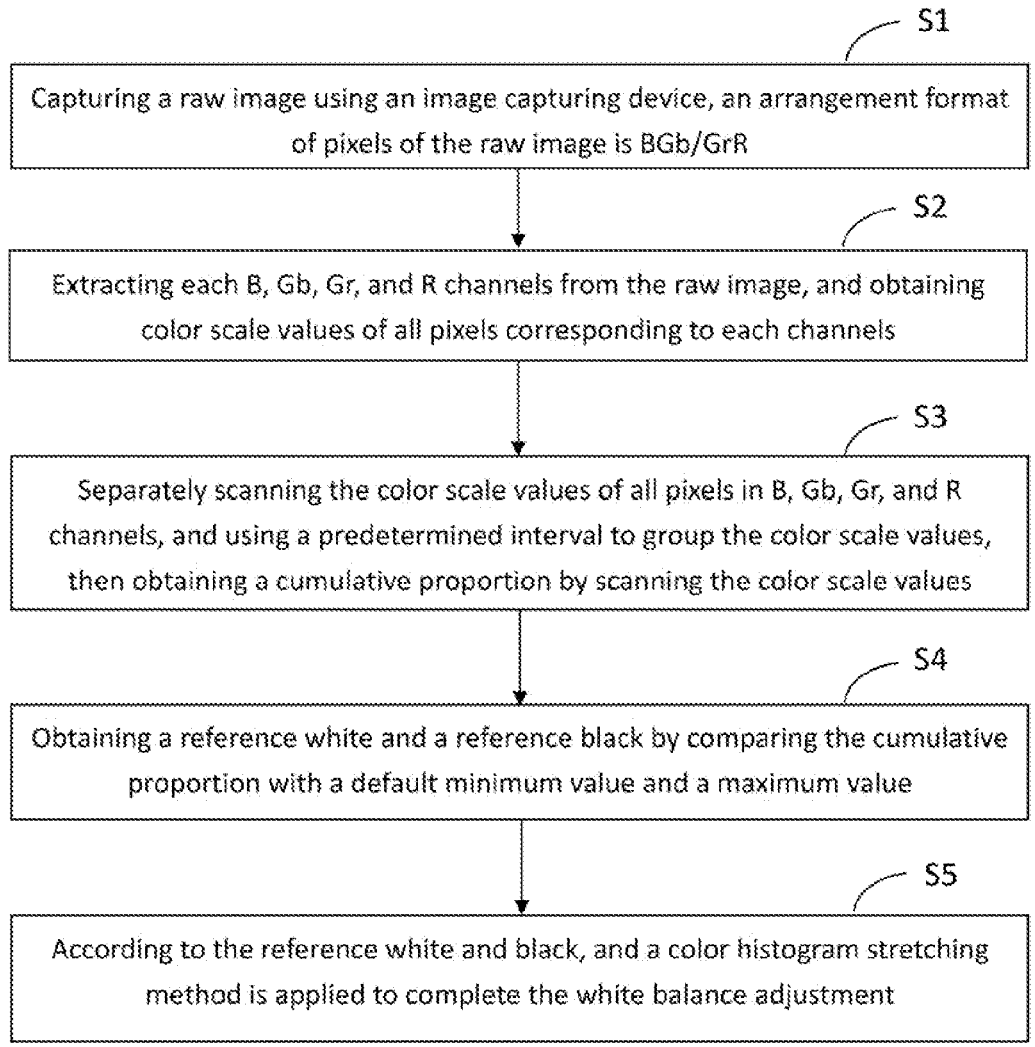
FIG. 2 is a flowchart of the present embodiment a white balance adjustment method.

FIG. 2 shows a white balance adjustment method of the present disclosure. In this embodiment, the white balance adjustment method is used to adjust white balance for an image. The white balance adjustment method for the image capturing device 100, includes the following steps:

In step S1, a raw image is captured by the image capturing device 100, the image includes a plurality of pixels, and each pixel is composed of red (R), green (G), and blue (B) sub-pixels. Each sub-pixel includes at least one color channel. The raw image is represented by R, G, and B color channels. Loading the raw image, where an arrangement format of pixels of the raw image is BGb/GrR.

In step S2, each of B, Gb, Gr, and R color channels from the raw image are extracted, and color scale values of all pixels corresponding to color channels are obtained.

In step S3, the color scale values of all pixels in the B, Gb, Gr, and R color channels are separately scanned, a predetermined interval is used to group the color scale values, a number of pixels corresponding to each color scale value in the predetermined interval is recorded, and cumulative proportions of each interval in the B, Gb, Gr, and R color channels are obtained.

In step S4, the cumulative proportion of each of the B, Gb, Gr, and R color channels are compared with a default minimum value and a default maximum value, to get a cumulative proportion which is greater than or equal to the maximum value and a cumulative proportion which is less than or equal to the minimum value, the cumulative proportion which is greater than or equal to the maximum value corresponding to an average value of the color scale values in the group is a reference white; the cumulative proportion which is less than or equal to the minimum value corresponding to an average value of the color scale values in the group is a reference black.

In step S5, the color scale values of each B, Gb, Gr, and R color channels are re-quantized, according to the reference white and the reference black, and then a color histogram stretching (CHS) method is used to complete the white balance adjustment.

With reference to FIG. 3, in step S1, the raw image comprises a plurality of pixel data ("raw" here means "unprocessed", the raw image comprising original and unprocessed data), and then, in the manner of a color filter placed over the image sensor, a "Bayer Pattern" can be obtained as shown in FIG. 3, that is BR/GR (in present embodiment represented as BGb/GrR) format; in other words, when odd-numbered lines of pixel are arranged in BGBGBG form, then the even-numbered lines of pixel are arranged in GRGRGR form, alternatively, when odd-numbered lines of pixels are arranged in GRGRGR form, then the even-numbered lines of pixels are arranged in BGBGBG form, where Gb is the G of the BGBG, and Gr is the G of the GRGR.

In step S2, each pixel is separately scanned to obtain color scale values of first pixel to the last pixel of each of the B, Gb, Gr, and R, and R color channels. There is no limit to obtain sequence of the color scale values of color channel pixels, it can be according to a color channel sequence of B, Gb, Gr, and R, or a color channel sequence of R, Gb, Gr, and B, it can also be other sequences. If 8 bits represents single pixel, then the color scale value is in a range of 0-255; if 10 bits represents single pixel, then the color scale value is in a range of 0-1023. In summary, the range of the color scale values of all pixels is [0, $2^n$-1], where "n" is a number of bits of the pixel.

In step S3, all of the color scale values of pixels of the R color channel are scanned, and a number of pixels corresponding to all of the color scale values are recorded.

A calculation method of the cumulative proportion is as follows: for example, data for total pixels of an raw image is 976×1296, in the R channel the color scale value is 1 corresponding to pixels which have 10000 pixels, the color scale value is 2 corresponding to pixels which have 5000 pixels, and the color scale value is 3 corresponding to pixels which have 10000 pixels, then when the color scale value is 3, the cumulative proportion is (10000+5000+10000)/(976×1296) =0.0198, therefore, the cumulative proportion 0.0198 corresponding to the color scale value 3.

The cumulative proportions in the present embodiment are not just for a single color scale value, but for all color scale values in the predetermined interval, values range of the predetermined interval is the same as for the color scale values, and the predetermined interval is greater than 1 and less than a integer of $2^n-1$. In the present embodiment, if predetermined interval is noted as Itv, then each color channel has $$\frac{2^n - 1}{Itv}$$

groups, will gets $$\frac{2^n - 1}{Itv}$$

cumulative proportions.

Assuming the predetermined interval is 5, then the color scale values of the pixels between 0-4, 5-9, 10-14 . . . etc. are classified in the same group, each cumulative proportion corresponding to a group of color scale values in the predetermined interval. And so on, the same method is used to obtain the cumulative proportion of the color scale values in the predetermined interval of B, Gb, and Gr color channels. There is no limit to obtain sequence of cumulative proportions of each color scale value in the predetermined interval of the B, Gb, Gr, and R color channels.

In step S4, the maximum value and the minimum value of each of the B, Gb, Gr, and R color channels can be defined the maximum and minimum values of different color channels may be the same or different. The values may be defined by a user. In the present embodiment, a default minimum value of each color channel is defined as 0.01 and a default maximum value of each color channel is defined as 0.99. All of the cumulative proportions of R color channel in the step S3 are compared with the maximum value and the minimum value, all of the cumulative proportions which are less than or equal to the minimum value are obtained, and all of the cumulative proportions which are greater than or equal to the maximum value are obtained. The cumulative proportion which is greater than or equal to the maximum value corresponding to an average value of the color scale values in the group is a reference white; the cumulative proportion which is less than or equal to the minimum value corresponding to an average value of the color scale values in the group is a reference black. The B, Gb, and Gr color channels are processed using the same method as for the R color channel, using their own cumulative proportions to obtain the reference white and the reference black for each color channel.

In step S5, each of the pixels in the raw image is adjusted according to the reference black and the reference white, the color scale value of the pixels after white balance adjustment is as follows:

$$\frac{C - L}{H - L} \times M,$$

where "C" represents the color scale of each pixel in the raw image, "H" represents the reference white, "L" represents the reference black, and "M" represents 255 or 1023. The pixels in the R, G, and B color channels correspond to H and L. For example, to calculate the color scale of the R color channel after pixel adjustment, the H and L should correspond to the R color channel. Using the same method as applied to the R color channel, according to the respective reference black and the reference white, to obtain a histogram corresponding to each color channel after white balance adjustment.

In present embodiment, the focus is not to store all the cumulative proportions of the color scale values of the RGB color channels, but to store the color scale values which are grouped by the predetermined interval, thus memory space is saved.

Figure 4:
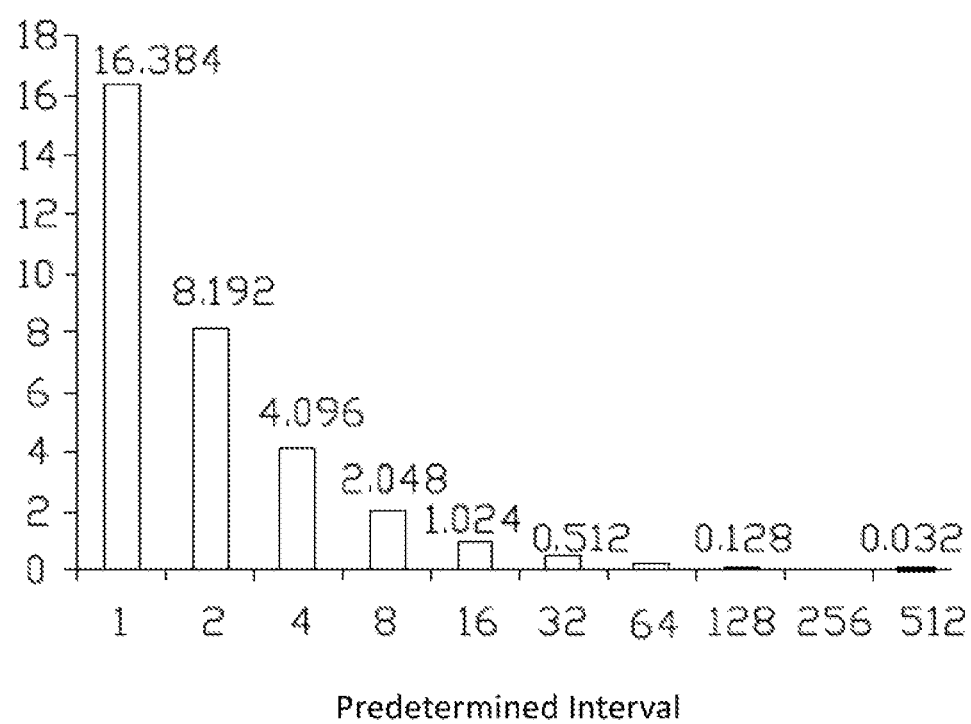
FIG. 4 is a schematic view of required memory space by the present white balance adjustment method, and by the color histogram stretching method of related art.

In FIG. 4, when the predetermined interval is 2, in the present embodiment, a required memory space is one half of that required for conventional technology; when the predetermined interval is 8, the required memory space is ⅛ of that of the conventional technology. Therefore, memory space taken by the present white balance adjustment method is much smaller than using the color stretching method to adjust the white balance of the image.

Although the present disclosure has been specifically described on the basis of these exemplary embodiments, the disclosure is not to be construed as being limited thereto. Various changes or modifications may be made to the embodiments without departing from the scope and spirit of the disclosure.

What is claimed is:

1. A white balance adjustment method of an image capturing device, the method comprising:
    capturing a raw image using the image capturing device, wherein an arrangement format of pixels of the raw image is BGb/GrR;
    extracting each of B, Gb, Gr, and R channels from the raw image, and obtaining color scale values of all pixels corresponding to each of the channels;
    separately scanning the color scale values of all pixels in the B, Gb, Gr, and R channels, using a predetermined interval to group the color scale values, recording a number of pixels corresponding to each color scale values in the predetermined interval, and obtaining the cumulative proportion of each color scale values in the B, Gb, Gr, and R channels;
    comparing the cumulative proportion of each of the B, Gb, Gr, and R channels with a default minimum value and a maximum value, to get a cumulative proportion which is greater than or equal to the maximum value and a cumulative proportion which is less than or equal to the minimum value, wherein the cumulative proportion which is greater than or equal to the maximum value corresponding to an average value of the color scale values in the group is a reference white; the cumulative proportion which is less than or equal to the minimum value corresponding to an average value of the color scale values in the group is a reference black; and re-quantizing the color scale values of each B, Gb, Gr, and R channels, according to the reference white and the reference black using a color histogram stretching (CHS) method; wherein the predetermined interval is greater than 1 and less than a integer of $2^n-1$.

2. The white balance adjustment method as claimed in claim 1, wherein the minimum value is 0.01, the maximum value is 0.99.

3. The white balance adjustment method as claimed in claim 1, wherein a range of the color scale values of all pixel is $[0, 2^n-1]$, where "n" is a number of bits of the pixel.

4. The white balance adjustment method as claimed in claim 1, wherein the color scale value of the pixels after white balance adjusted is as follow:

$$\frac{C-L}{H-L} \times M,$$

where "C" represents a color scale of each pixels in the raw image, "H" represents the reference white, "L" represents the reference black, and "M" represents 255 or 1023.

* * * * *